UNITED STATES PATENT OFFICE.

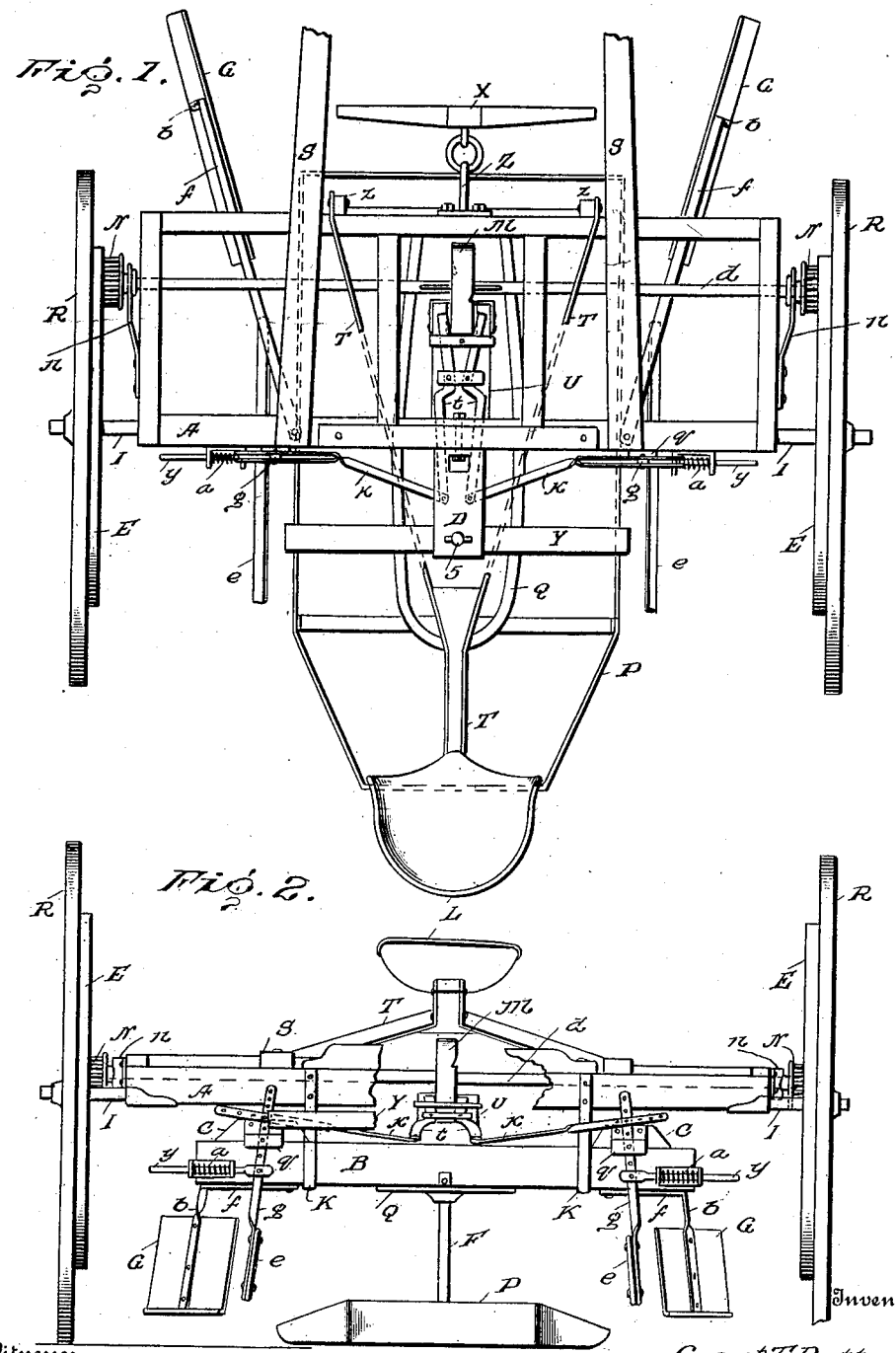

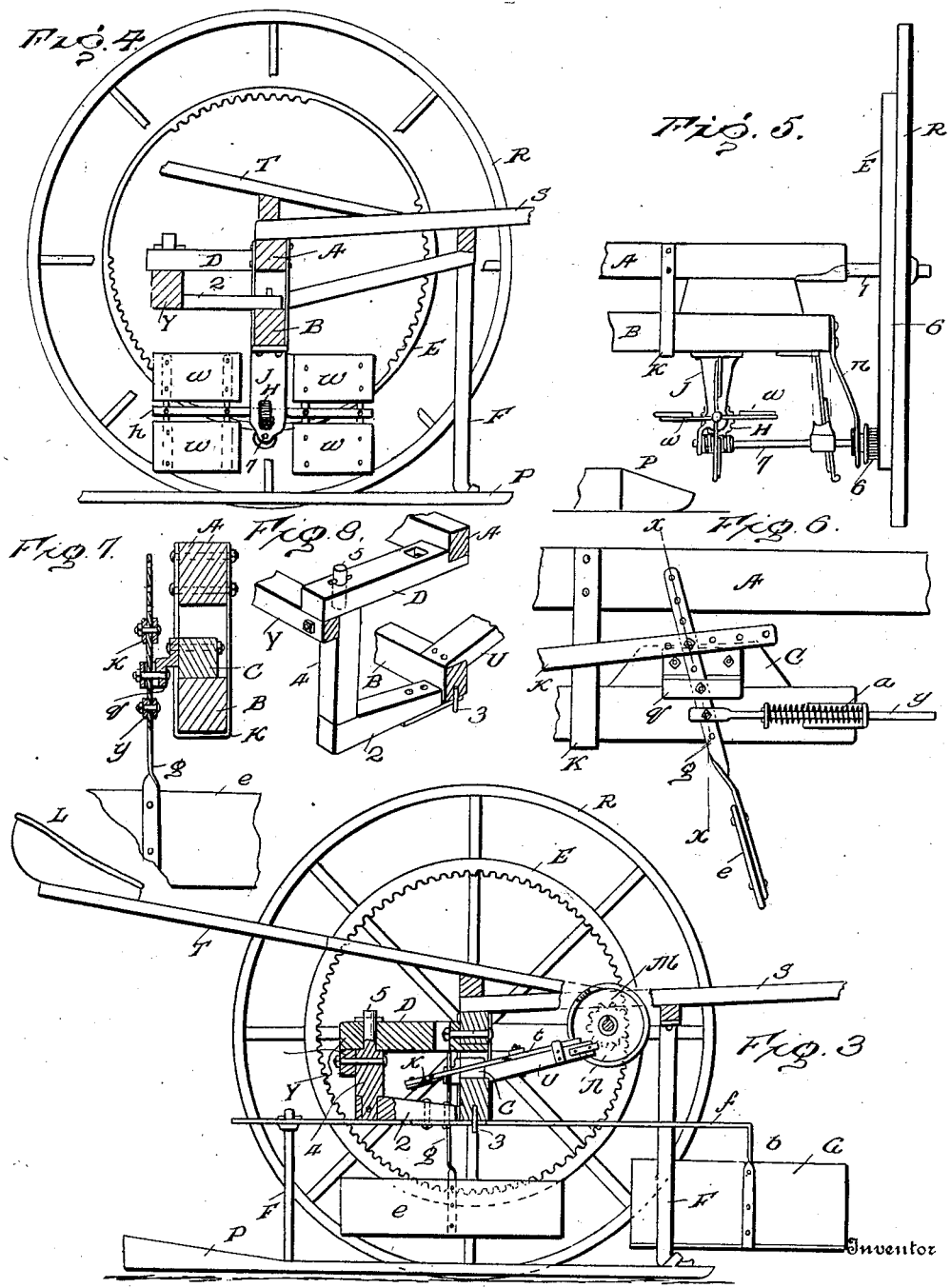

GRANT TORANCE PATTEN, OF PIQUA, OHIO.

INSECT-EXTERMINATOR.

No. 897,650.     Specification of Letters Patent.     Patented Sept. 1, 1908.

Application filed November 30, 1907. Serial No. 404,513.

*To all whom it may concern:*

Be it known that I, GRANT TORANCE PATTEN, citizen of the United States, residing at Piqua, in the county of Miami and State of Ohio, have invented certain new and useful Improvements in Insect-Exterminators, of which the following is a specification.

The present invention appertains to means for ridding fields of insects such as are destructive to and infest vines of potatoes and like tubers or vegetables.

The invention is designed to provide a machine of novel formation to be drawn over the field and provided with means for dislodging insects from the vines and collecting the same in a pan or other suitable receptacle to be subsequently destroyed or disposed of as may be desired to effect their extermination.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of a machine of the character aforesaid embodying the invention. Fig. 2 is a rear view of the machine, parts being broken away. Fig. 3 is a central longitudinal section of the machine, showing the pan or receptacle and the seat in full lines. Fig. 4 is a view similar to Fig. 3 of a modification. Fig. 5 is a detail view of a side portion of the modified form of the machine illustrated in Fig. 4. Fig. 6 is a detail view of a portion of the main frame, an end of the longitudinally movable beam, a blade or beater and parts coöperating with said blade. Fig. 7 is a sectional view on the line $x$—$x$ of Fig. 6. Fig. 8 is a detail perspective view of a portion of the longitudinally movable beam, the foot-bar and adjunctive parts.

Corresponding and like parts are referred to in the following description and indicated in all the views of the drawings by the same reference characters.

The main frame comprises an axle A provided at opposite ends with spindles or arms I upon which ground or supporting wheels R are mounted, said ground wheels having internally toothed rims E secured thereto and in mesh with pinions N carried by a shaft $d$ located in advance of the axle and mounted in suitable bearings applied to the main frame. Flat springs $n$ secured to the longitudinal end bars of the main frame exert an outward pressure upon the pinions N to hold them in meshing relation with the toothed rims R. A cam wheel M is mounted upon the shaft $d$ to rotate therewith and has a limited movement on said shaft, being splined thereto so as to rotate therewith in any adjusted position.

A beam B is located below the axle A and is supported in hangers or stirrups K which embrace opposite sides of the parts A and B and are secured at their upper ends to the axle A, said beam B being free to move in the direction of its length to impart a lateral movement to the devices carried thereby, whereby provision is had for following uneven rows. The beam B is adapted to be controlled in its movements by the operator or driver perched upon the seat L, the latter being mounted upon bars T which incline forwardly and flare laterally and are pivoted at their front ends to the main frame at $z$. A foot-bar Y extends transversely of the machine and has pivotal connection midway of its ends with a bar D of the main frame and has a bar 2 connected therewith so that as said foot-bar is turned the bar 2 has a corresponding movement imparted thereto, which is transmitted to the beam B by suitable connections, such as pins 3 extended from the beam B into the path of a projecting part of said bar 2 to be engaged thereby. A post 4 connects the bars 2 and Y and is journaled at 5 to the bar D. A bar U projects upward and forward from the beam B. The bar U and beam B carry the operating devices, such as guides G, blades $e$, pan or insect receptacle P and the means for transmitting motion from cam M to the blades $e$ for imparting a vibratory movement thereto for dislodging the insects from the vines and causing them to fall into the pan or receptacle P.

The guides G are located at opposite sides of the machine and flare forwardly so as to move the vines inward into the path of the blades $e$. The guides G consist of blades or wings carried by stems $b$ which form a part of or have connection with horizontal arms $f$, which in turn are connected at their rear ends to the beam B and movable therewith.

The blades e are arranged in the rear of the guides G and constitute knockers to agitate or strike the vines with sufficient force to dislodge the insects and cause them to fall into the pan or receptacle P. The blades e are carried by stems g which are vertically adjustable and have connection by means of links k with levers t mounted upon the bar U and arranged to have their front ends extend upon opposite sides of the cam M to be operated thereby. The cam M is of such construction as to alternately operate the levers t. Springs a coöperate with the blades or knockers e to hold the front ends of the levers t in close contact with opposite sides of the cam M. The springs a are mounted upon rods y, which in turn are slidably mounted in keepers attached to the beam B and which rods have connection with the stems g. The springs a are confined between stops of the rods y and projecting portions of the keepers in which said rods are mounted and normally exert an inward pressure upon the rods y. The stems g are mounted in keepers q attached to blocks C mounted on end portions of the beam B.

The pan or receptacle P is carried by rods F which are attached at their upper ends to a frame Q having connection with the beam B so as to move therewith and maintain a fixed position relative to the blades or knockers e. The pan or receptacle is shallow and is arranged to run close to the ground and beneath the overhanging vines so as to catch the insects dislodged therefrom. The rear portion of the pan is made comparatively high so as to collect the insects and prevent the vines sweeping the insects therefrom. The thills or shafts S are attached to members of the main frame and the swingle-tree X is connected by links Z to the front portion of the main frame. As the machine is drawn over the field the guides G move the vines inward and the blades e vibrating strike or beat the vine and knock the insects therefrom and the pan P receives the same. After a sufficient quantity of insects have accumulated they are disposed of in any manner to effect their extermination.

In the construction shown in Figs. 4 and 5, the blades e are replaced by means of rotary knockers or beaters W whose shaft h is mounted in a bearing J carried by the beam B. A pinion H attached to the shaft h is adapted to be connected in any manner so as to receive motion from the toothed rim E of the adjacent ground wheel. The rotary knocker or beater W may be intermittently operated similar to the knocker e by providing the rim E with toothed portions at intervals in its length and having said toothed portions engaged with a pinion 6 fast to a shaft 7, which latter is in turn connected to the shaft h.

Having thus described the invention, what is claimed as new is:

1. In a machine of the character set forth, the combination of a framework adapted to be advanced over the field, a second framework movable with reference to the main framework and adapted to be controlled by the operator or driver to cause it to follow crooked rows of vines or plants, and means for dislodging and collecting insects carried by the said second framework and movable therewith.

2. In combination, a main framework, actuating means mounted thereon, a second framework adjustable with reference to the main framework and provided with means for dislodging insects from the vines or plants, and means mounted upon said second framework for transmitting power from the aforementioned actuating means to the insect dislodging means.

3. In a machine of the character described, the combination of a main framework, ground wheels supporting said framework, a second framework connected with and carried by the main framework, means under control of the driver to admit of moving said second framework to cause it to follow irregularities in the rows of vines or plants, a receptacle connected with said second framework and arranged to catch dislodged insects, insect dislodging means mounted upon said second framework and movable therewith, and actuating means for operating the insect dislodging means from the aforementioned ground wheels.

In testimony whereof I affix my signature in presence of two witnesses.

GRANT TORANCE PATTEN. [L. S.]

Witnesses:
 HARRY W. KRESS,
 CLARENCE YENNEY.